Figure 3:
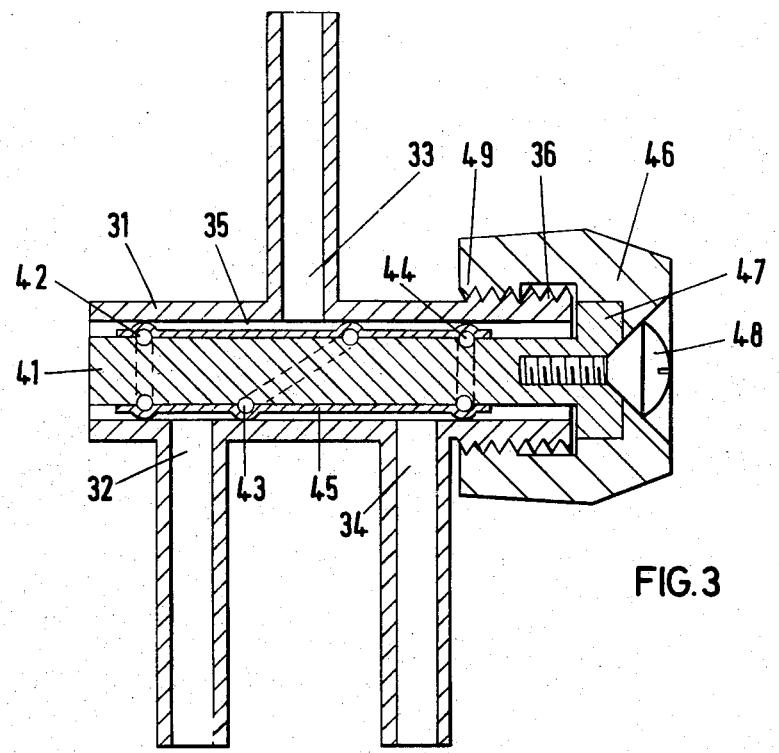

United States Patent [19]

Nightingale

[11] 3,993,099

[45] Nov. 23, 1976

[54] PLUG VALVES

[75] Inventor: Douglas Daniel John Nightingale, St. Albans, England

[73] Assignee: Imperial Chemical Industries Limited, London, England

[22] Filed: June 6, 1975

[21] Appl. No.: 584,533

[30] Foreign Application Priority Data

June 25, 1974 United Kingdom............... 28099/74

[52] U.S. Cl..................... 137/625.48; 137/625.46; 251/309; 251/324
[51] Int. Cl.......................... F16k 11/06; F16k 3/00
[58] Field of Search .......... 251/172, 175, 214, 215, 251/325; 137/375, 625.17, 625.21, 625.4, 625.47, 625.48, 625.69

[56] References Cited
UNITED STATES PATENTS

| 3,062,496 | 11/1962 | Stehlin | 251/324 X |
| 3,146,795 | 9/1964 | Retallick | 137/625.47 X |
| 3,532,123 | 10/1970 | Anthony | 251/172 X |
| 3,538,952 | 11/1970 | Bayer | 137/625.17 |
| 3,589,677 | 6/1971 | Segers | 251/215 |
| 3,612,479 | 11/1971 | Smith | 251/DIG. 1 |
| 3,747,479 | 7/1973 | Nightingale et al. | 251/214 |

Primary Examiner—Alan Cohan
Attorney, Agent, or Firm—Cushman, Darby & Cushman

[57] ABSTRACT

A plug valve having radial ports has a spindle with a plastics sleeve biased by underlying O-rings into sealing contact against the surrounding valve body to subdivide the space between the sleeve and the bore and thereby define at least one discrete passage alignable with selected ports to permit fluid flow therebetween. The valve may be a multiway valve or simply an on/off valve.

6 Claims, 4 Drawing Figures

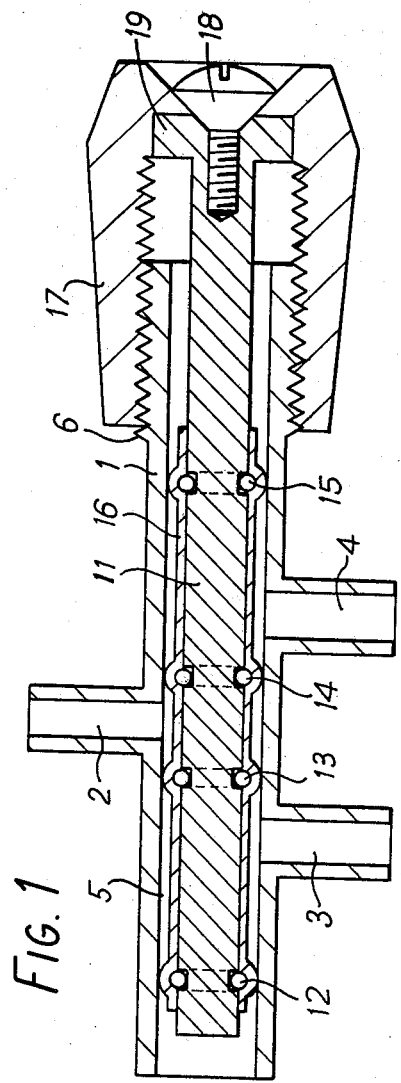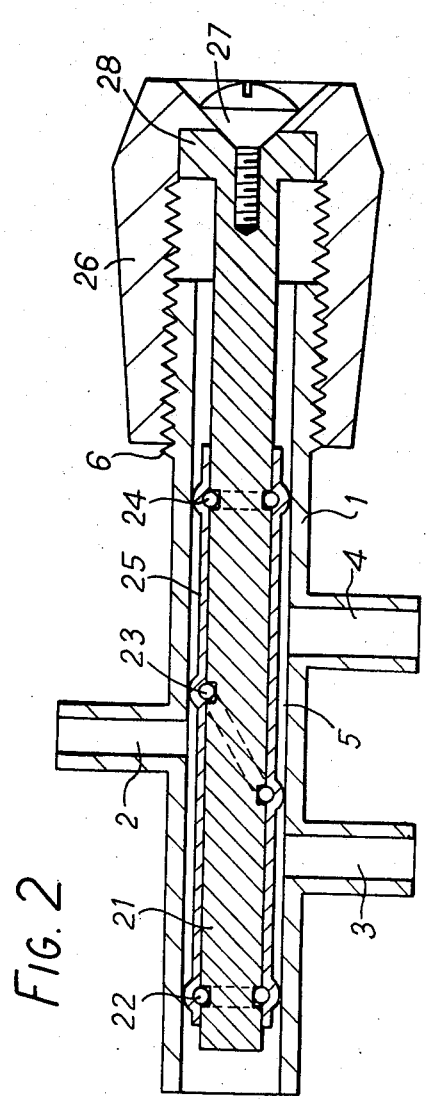

PLUG VALVES

The invention relates to plug valves and especially to valve spindles which can be easily and cheaply manufactured for controlling fluids in e.g. laboratory glassware.

According to the present invention there is provided a plug valve comprising a spindle located within the bore of a valve body wherein the body has at least two radial ports communicating with the bore and the diameter of the spindle is less than the diameter of the bore to provide space for fluid to flow therebetween when passing from one port to another, the spindle comprising a mandrel encircled by a plurality of O-rings located in grooves around the mandrel and covered by a plastics sleeve which provides a covering extending continuously over all of said O-rings and the areas of the mandrel therebetween, the external diameter of the O-rings being greater than that of the mandrel so that the portions of the sleeve overlying the O-rings stand proud of the portions therebetween and are biased by the O-rings against the bore to form sliding seals between the spindle and the bore, whereby the space enclosed between the spindle and the bore is divided by the seals to define at least one discrete flow passage alignable with selected ports to permit fluid flow therebetween.

The valve may have at least three radial ports and a multiway function giving a choice of flow paths, or simply be a valve whose sole function is to provide on/off control. The multiway function may be provided for example, by having a single passage (as defined by two O-rings) which may be moved to interconnect selected ports. Alternatively, the different flow paths may be provided by different passages, which may, for example be aligned each with a separate port, each passage being alignable in turn with a single inlet or outlet port to provide the choice of paths. Although it may sometimes be useful to vent unconnected ports, it is generally preferred to locate the two outermost O-rings outside all the ports so as to seal the valve against loss of fluid flowing through the space between the spindle and the bore, intermediate O-rings dividing said space into two or more discrete flow passages alignable with selected ports.

Because the sleeve extends over all the O-rings and intervening areas of the mandrel, the O-rings are isolated by the sleeve from any fluid flowing through the valve. The O-rings may therefore be formed of any suitable material such as rubber, even when organic solvents and other materials detrimental to rubber are being passed through the valve. The sleeve, however, must be inert to the fluid being passed through the valve. Thus for many operations, sleeves of readily formable materials such as polyethylene and nylon may be used, but for general application where inertness to a wide spectrum of fluids is required, fluorine-containing polymers are preferred. A preferred fluorine-containing polymer is polytetrafluoroethylene (PTFE), and a sleeve of this material may be applied to a mandrel having O-rings installed, by warming the PTFE sleeve to soften it, and then sliding it over the mandrel and O-rings. Where the internal diameter of the cold sleeve is the same or less than the diameter of the mandrel, on cooling the PTFE fits closely over the mandrel, the sleeve being distended outwards where it overlies the O-rings. This outward distension is generally sufficient to prevent any sliding of the PTFE sleeve along the mandrel, particularly when the thickness of the distended portions of the sleeve is less than 0.63 mm (0.025 inch). The thickness of the sleeve is however, preferably at least 0.3 mm (0.012 inch) throughout its length as thinner sleeves are more difficult to handle.

An alternative method of manufacturing the spindles is to insert the mandrel with its O-rings into an oversize tube of shrinkable material, and then shrinking the tube onto the mandrel and O-rings so that it conforms to the contour of the mandrel and O-rings. For example the sleeve may be formed from heat-shrinkable polypropylene tubing of an appropriate gauge. As with the PTFE sleeve, a thickness of less than 0.63 mm is preferred, but thinner sleeves than those of PTFE may be satisfactorily used, depending on the toughness required during operation of the valve. The preferred fluorine-containing polymers for this method of manufacturing the spindles are the heat-shrinkable tetrafluoroethylene-hexafluoropropylene copolymers.

The present invention is particularly suited to the provision of relatively cheap but efficient valves for laboratory glassware. The valve body may then suitably be formed of glass compatible with the glass employed in the remainder of the apparatus. However, other rigid materials may likewise be used, as appropriate to the materials of apparatus into which it may be incorporated. For example the body may be moulded from rigid thermoplastics inert to the fluid to be controlled, the thermoplastics being reinforced, e.g. with glass fibres, as appropriate.

The present valves provide a number of advantages over earlier plug valves in which the flow passages were formed as channels in the surface. For example, the O-rings being themselves narrow, they apply sealing pressure over a narrower area and a more efficient seal may be obtained. By forming all the seals in the same way using O-rings of similar dimensions, the improvement in sealing efficiency is uniform. The lower friction for a given sealing pressure enables the wider choice of materials to be used. Thus whereas the use of relatively expensive polytetrafluoroethylene was previously necessary to reduce friction to a tolerable level, other cheaper materials can be selected for use in the present valves (where the nature of the fluids permits) without necessarily rendering them unusably stiff in operation. By forming the annular sealing portions as part of a continuous sleeve instead of as individual O-rings without a covering sleeve, the number of possible leakage paths is halved, and the leak rate is consequently reduced. This can be important where high pressure differentials are required. Furthermore the protection afforded by the continuous sleeve enables the most appropriate resilient materials to be used for the O-rings, irrespective of the fluids flowing or intended to flow through the valve. The pressure applied by the sealing portions against the bore is a radial pressure, and by using a central mandrel to stabilise the spindle, the radial sealing pressure is generally maintained rather than becoming dissipated as an axial stretching force.

Figure 4:
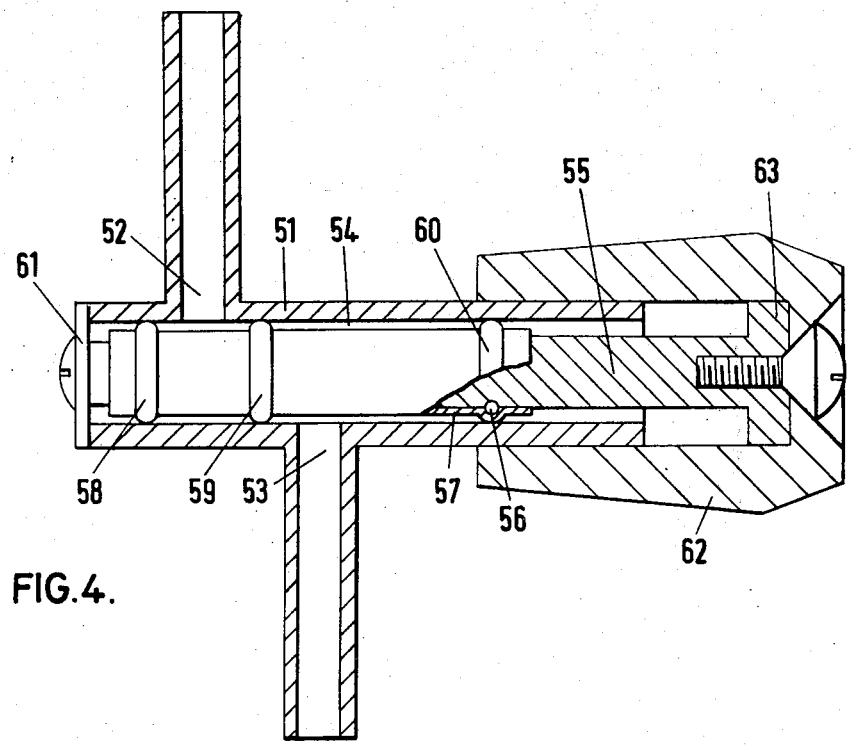

The invention is illustrated by reference to specific embodiments thereof shown in the accompanying drawings by way of example. In the drawings:

FIG. 1 is a section through a three-port multiway valve operable by axial movement of the spindle, FIG. 2 is a section through the same valve body fitted with a different spindle to make the valve operable by rotation of the spindle, FIG. 3 is a section through a further rotary operable valve, and FIG. 4 is a part section through an on/off valve.

The valve shown in FIG. 1 comprises a valve body 1 having three radial ports 2,3,4 communicating with a cylindrical bore 5 through the middle of the valve body. One end of the body has screw threads 6.

Located within the bore is a spindle comprising a mandrel 11 having four O-rings 12,13,14,15 located in grooves in the mandrel. The O-rings are all orthogonal to axis of the spindle. Overlying all of the O-rings and the intervening areas of the mandrel is a thin protective sleeve 16. The outer surface of the sleeve other than where it overlies the O-ring, is spaced away from the bore sufficiently to permit fluid to flow between. However, the parts of the sleeve overlying the O-rings are pressed into sealing contact with the bore by the O-rings. One end of the spindle is provided with a cap 17 attached by a screw 18 to the spindle, and fitting closely over a shoulder 19 formed on the mandrel. The cap engages the screw threads 6 on the body.

In operation, the two outermost O-rings 12,15 form seals which remain outside the outermost ports 3,4 in all operating positions of the valve. These seal the valve against loss of fluid flowing through the valve. The intermediate O-rings 13,14 form seals by pressing the overlying sleeve against the bore, these seals dividing the space between the spindle and bore (as limited at either end by the seals of O-rings 12, and 15) into three discrete flow passages. In the position shown, the valve is closed, each of the ports communicating with a separate flow passage. Rotation of the cap to withdraw the spindle will eventually bring the flow passage between the seals of O-rings 12, and 13 into alignment with both ports 2 and 3 so that fluid may flow between them. The other port 4 is isolated by O-ring 13. On rotation of the cap in the opposite direction, the valve passes through the closed position illustrated, until ports 2 and 4 are interconnected by the flow passage between the seals of O-rings 14 and 15, the seal of O-ring 14 isolating the other port 3.

Because of the shoulder 19, the spindle is rotated when the cap rotates, this rotation being provided so as to even up any wear on the sealing portions of the sleeve caused by any unevenness where the ports enter the bore. However, as will be appreciated, the operation of the valve illustrated in FIG. 1 is effected by sliding the spindle axially along the bore, and so rotation of the spindle is not essential and a rotatable coupling may be provided between the cap and the spindle if so desired.

In FIG. 2, the valve body is the same as that of FIG. 1, and like reference numerals have been used for like parts. The spindle, however, is different, comprising a mandrel 21 having only three O-rings 22,23,24 set into grooves and covered by an overlying sleeve 25. The mandrel again has a cap 26 attached by a screw 27 and prevented from rotation by shoulders 28. The cap engages threads 6 on the body.

The outermost O-rings provide seals outside the outermost ports 3,4 so as to seal the valve against loss of fluid at all operating positions. The intermediate O-ring 23 is oblique and provides a seal which divides the space between the spindle and the bore into two separate flow passages. In the position shown in FIG. 2, ports 2 and 3 are interconnected by the flow passage bounded by the seals of O-rings 22 and 23, and the other port 4 is isolated by the seal of the oblique O-ring 23. Rotation of the spindle by half a turn brings the flow passage bounded by the seals of O-rings 23 and 24 into alignment with the ports 2 and 4 so that fluid may flow between them, the remaining port 3 being isolated by the seal of the oblique O-ring 23.

Operation of the valve shown in FIG. 2 is thus by rotation of the spindle within the bore, but because of the screwed connection between the valve body and the cap, this rotation also produces linear movement axially along the bore. This can be helpful in that it enables the angle of the intermediate O-ring to be less. However where such linear movement can occur it is preferable to provide some form of stop or indicating means to avoid an inbalance of the direction of rotation during use, as such an inbalance would eventually displace the seals beyond their appropriate stations. These problems of possible displacement may also be overcome by modifying the valve so that no linear motion occurs during operation of the valve. Such a valve is shown in FIG. 3, the valve having features essentially similar to those of the valve shown in FIG. 2, in order to clarify the comparison.

The valve of FIG. 3 comprises a body 31 having three radial ports 32,33,34 communicating with a cylindrical bore 35. The spindle comprises a mandrel 41 having three O-rings 42,43,44 set into grooves and covered by an overlying sleeve 45. The two outermost O-rings 42,44 are located in grooves placed closer to the outermost ports 32,34 than those 22,24 of the valve of FIG. 2. This reduces the dead volume within the space between the spindle sleeve 45 and the bore 35, and also enables the total length of the valve to be reduced. At the end of the spindle is mounted a cap 46 fitted over shoulders 47 and secured by an axial screw 48. The end of the valve body and the inner wall of the cap are provided with co-operable screw threads 36,49. These screw threads are both very short, about 2–3 turns being shown, but a single turn each being adequate. The cap is mounted on the end of the body by screwing it forwards until the two screw threads have passed each other, the shoulders 47 then being adjacent the end of the body, i.e. as shown in FIG. 3.

The valve is operated in precisely the same manner as that shown in FIG. 2, i.e. by rotating the spindle through 180° to change the flow between ports 33 and 32 to flow between ports 33 and 34, and vice versa. However, because the screw threads on the cap and body are disengaged, rotation of the spindle does not produce any linear motion. By gently pressing the spindle cap towards the body when effecting rotation, so that the shoulders 47 are held against the end of the body, the position of the seals with respect to the body, is well maintained, and reengagement of the screw threads is avoided. A spring may be provided to bias the shoulders against the body if desired, e.g. in the manner used to bias tapered stop cocks.

In both these rotary operable valves, there are no "off" positions, but one may be provided by the provision of a further intermediate O-ring parallel to that 23,43 shown in each case, the oblique O-rings being spaced apart to provide a space therebetween which is only alignable with the central port 33. These intermediate O-rings may be spaced further apart when there is linear motion during operation of the valve in addition to the rotary motion, e.g. as in the valve shown in FIG.

2, and this renders the positioning of the spindle for the off mode, less critical.

The spindles may be provided with further intermediate seals to accommodate further radial ports, for operation in the same manner as described above, and in more complex valves, the flow paths may be arranged to enable flow of different fluids to occur along separate flow paths. By suitably inclining sufficient intermediate O-rings, a combination of linear and rotational operating motions may be provided.

The valve illustrated in FIG. 4 is a simple on/off plug valve, and comprises a body 51 having two ports 52,53 and a cylindrical bore 54 in which is located a spindle. The spindle comprises a mandrel 55 having three O-rings (only one 56 shown), in grooves around the mandrel in planes perpendicular to the spindle axis. The external diameter of the O-rings is greater than that of the mandrel. Around the mandrel, and overlying all three O-rings is a sleeve 57 which conforms to the shape of the mandrel and O-rings so that the annular portions 58,59,60 overlying the O-rings stand proud of the remainder, the diameter of the remainder being less than the diameter of the bore 54, leaving a space for fluid to flow therebetween. The three annular portions 58,59,60 standing proud of the remainder have a free diameter greater than the diameter of the bore, so that when within the bore, the resilient O-rings are compressed and bias the overlying portions against the bore forming a seal. The two outer seals 58, 60 define the outer limits of the utilised space between the spindle and the bore, and the intermediate seal 59 divides this space into two parts. At one end of the mandrel is screwed a plate 61, and at the other end, a cap 62 is located over shoulders 63 and secured to the mandrel in substantially the same manner as shown in the previous drawings. This cap 62 differs from those of the previous drawings, however, by being a sliding fit on the valve body instead of being screwed thereto. The spindle is thus free to slide along the bore.

As depicted in FIG. 4, the valve is in the off position. Movement to the right is prevented by the end plate 61 abutting the end of the body. To turn the valve on, the spindle is slid along the bore to the left until the shoulders 63 abut the end of the body. In doing so the intermediate seal 59 crosses the upper port 52, whereby that port becomes interconnected with the other port 53. To turn the valve off again, the spindle is slid to the right until further movement is prevented by the plate 61 abutting the end of the body.

Where it is desired to vent one of the ports when the valve is in the off position, the valve shown in FIG. 4 may be used, but modified by the omission of the end O-ring remote from the cap, so that there will be no respective upstanding portion 58 to form a seal. Thus the upper port 52 will be vented to the atmosphere while the two remaining O-rings seal off the lower port 53 from the atmosphere and from the upper port 52 as before. If the venting is hindered unduly by the end plate 61, the latter may be replaced by a spider or narrow bar.

I claim:

1. A plug valve comprising a valve body having a bore and at least two radial ports communicating with said bore, and a spindle located within the bore, wherein the diameter of the spindle is less than the diameter of the bore to provide space for fluid to flow therebetween when passing from one port to another, the spindle comprising a mandrel encircled by a plurality of O-rings located in grooves around the mandrel and covered by a plastics sleeve which provides a covering extending continuously over all of said O-rings and the areas of the mandrel therebetween, the external diameter of the O-rings being greater than that of the mandrel so that the portions of the sleeve overlying the O-rings stand proud of the portions therebetween and are biased by the O-rings against the bore to form sliding seals between the spindle and the bore, whereby the space enclosed between the spindle and the bore is divided by the seals to define at least one discrete flow passage alignable with selected ports to permit fluid flow therebetween.

2. A valve according to claim 1 having at least three radial ports and a multiway function providing a choice of flow paths.

3. A valve according to claim 1 wherein the body has two ports, and the spindle has at least two spaced-apart O-rings biasing the overlying sleeve into sealing contact with the bore, the seals thus formed dividing the space between the spindle and the bore to form a flow passage therebetween alignable with both ports simultaneously, the spindle being movable to remove said alignment in respect of one or both ports, whereby the valve provides on and off functions respectively.

4. A valve according to claim 1 having at least three O-rings, the two outermost O-rings being located outside all the ports so as to seal the valve against loss of fluid flowing through the space between the spindle and the bore, the intermediate O-rings dividing said space into two or more discrete flow passages alignable with selected ports to allow fluid to flow therebetween.

5. A valve according to claim 1 in which the thickness of the sleeve is at least 0.3 mm throughout its length.

6. A valve according to claim 1 in which the thickness of the distended portions of the sleeve is less than 0.63 mm.

* * * * *